United States Patent
Kowald et al.

(10) Patent No.: US 9,561,564 B2
(45) Date of Patent: Feb. 7, 2017

(54) FURNACE BURNER BOX

(71) Applicant: Lennox Industries Inc., Richardson, TX (US)

(72) Inventors: Glenn W. Kowald, Carrollton, TX (US); Hans J. Paller, Louisville, KY (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 14/946,743

(22) Filed: Nov. 19, 2015

(65) Prior Publication Data

US 2016/0074978 A1 Mar. 17, 2016

Related U.S. Application Data

(62) Division of application No. 12/834,635, filed on Jul. 12, 2010, now Pat. No. 9,212,820.

(60) Provisional application No. 61/295,501, filed on Jan. 15, 2010.

(51) Int. Cl.
  *F24H 3/00* (2006.01)
  *B23P 15/26* (2006.01)
  *F23L 1/00* (2006.01)

(52) U.S. Cl.
  CPC ............ *B23P 15/26* (2013.01); *F23L 1/00* (2013.01); *Y10T 29/4935* (2015.01)

(58) Field of Classification Search
  CPC ........ F23D 14/34; F24H 9/0068; F24H 3/065; F24D 5/02
  USPC ................ 126/99 D, 99 R; 237/16
  See application file for complete search history.

(56) References Cited

U.S. PATENT DOCUMENTS

| 2,023,136 A | | 12/1935 | Herbster | |
| 2,160,264 A | * | 5/1939 | Furlong | F24H 3/006 126/116 A |
| 4,549,866 A | * | 10/1985 | Granville | C21D 9/50 432/10 |
| 4,752,213 A | * | 6/1988 | Grochowski | F23D 14/02 431/328 |

(Continued)

FOREIGN PATENT DOCUMENTS

| CN | 20092063 | 1/1992 |
| CN | 201177366 | 1/2009 |

(Continued)

OTHER PUBLICATIONS

Translation of Chinese Office Action dated May 22, 2014, Applicant: Lennox Industries Inc., 10 pages.

*Primary Examiner* — Craig Schneider
*Assistant Examiner* — Angelisa L Hicks
(74) *Attorney, Agent, or Firm* — Hubbard Johnston, PLLC

(57) ABSTRACT

An HVAC burner box includes a burner bank, a manifold and an air director located within an enclosure. The burner bank is oriented such that an outlet end of the burner bank is directed toward a first end of the enclosure. The manifold is located within the enclosure and adjacent an inlet end of the burner bank. The air director has a diffuser that is coupled to a side of the enclosure. The diffuser includes a plurality of openings located therethrough. The diffuser is configured to direct a first portion of a received airstream through the opening and toward the burner bank. The diffuser is further configured to send a second portion of the received airstream toward the manifold.

4 Claims, 9 Drawing Sheets

(56) References Cited

U.S. PATENT DOCUMENTS

| | | | |
|---|---|---|---|
| 4,848,313 A * | 7/1989 | Velie | F24H 3/0488 |
| | | | 126/110 B |
| 5,197,415 A | 3/1993 | Stretch et al. | |
| 5,201,651 A * | 4/1993 | Niksic | F23N 1/027 |
| | | | 126/110 B |
| 5,417,199 A | 5/1995 | Jamieson et al. | |
| 5,799,646 A | 9/1998 | Zia et al. | |
| 6,021,775 A | 2/2000 | Dempsey et al. | |
| 6,422,178 B1 | 7/2002 | Lannes et al. | |
| 6,491,514 B1 * | 12/2002 | Hamad | F23L 1/00 |
| | | | 126/110 R |
| 2009/0044793 A1 | 2/2009 | Khan et al. | |

FOREIGN PATENT DOCUMENTS

| | | |
|---|---|---|
| EP | 0596555 A1 | 5/1994 |
| FR | 2581735 A1 | 11/1986 |
| JP | 56020908 A | 2/1981 |

\* cited by examiner

FURNACE BURNER BOX

CROSS-REFERENCE TO RELATED APPLICATION

This application is a Divisional of U.S. patent application Ser. No. 12/834,635, filed on Jul. 12, 2010, entitled "Furnace Burner Box," which claims the benefit of U.S. Provisional Application Ser. No. 61/295,501, filed on Jan. 15, 2010, both of which are herein incorporated in their entirety by reference for all purposes.

TECHNICAL FIELD OF THE INVENTION

The present invention is directed, in general to an HVAC system, and more specifically, to a burner box.

BACKGROUND OF THE INVENTION

A typical residential HVAC system includes a furnace and air conditioning (A/C) condenser in an assembly that includes a circulating fan. As the furnace produces heat, or an outdoor refrigeration unit provides chilled refrigerant, the fan operates to circulate interior air through the assembly to heat or cool the air as appropriate.

As the HVAC market has developed, additional components have become more common in residential HVAC units, including, e.g. humidifiers, electronic air filters and UV sterilizers. Inclusion of one or more of these components in the HVAC assembly may increase the space required to locate the assembly within the residence. In some cases, a cramped installation site such as a furnace closet may make installation of an HVAC system difficult or impossible in the available space.

SUMMARY OF THE INVENTION

In one aspect the present disclosure provides an HVAC burner box. The burner box includes an enclosure, within which are located a burner bank, a manifold and an air director. The burner bank is oriented such that an outlet end of the burner bank is directed toward a first end of the enclosure. The manifold is located within the enclosure and adjacent an inlet end of the burner bank. The air director includes a diffuser, and is coupled to a side of the enclosure. The diffuser includes a plurality of openings located therethrough. The diffuser is configured to direct a first portion of a received airstream through the openings and toward the burner bank. The diffuser is further configured to send a second portion of the received airstream toward the manifold.

In another aspect, the disclosure provides a furnace. The furnace includes a heat exchanger assembly that includes a vest panel. A burner box is fastened to the vest panel. The burner box includes an enclosure, with a burner bank, a manifold and an air director located within the enclosure. The burner bank is oriented such that an outlet end of the burner bank is directed toward a first end of the enclosure. The manifold is located within the enclosure and adjacent an inlet end of the burner bank. The air director includes a diffuser, and is coupled to a side of the enclosure. The diffuser includes a plurality of openings located therethrough. The diffuser is configured to direct a first portion of a received airstream through the openings and toward the burner bank. The diffuser is further configured to send a second portion of the received airstream toward the manifold.

In yet another aspect, a method of manufacturing an HVAC burner box is provided. The method includes joining a burner bank to an enclosure such that an outlet end of the burner bank is directed toward a first end of the enclosure. A manifold is located within the enclosure and adjacent an inlet end of the burner bank. An air director is coupled to a side of the enclosure. The air director includes a diffuser that has a plurality of openings located therethrough. The diffuser is configured to direct a received airstream through the openings such that a first portion of the airstream is directed toward the burner bank and a second portion is directed toward the manifold.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various embodiments described herein provide for a burner box having a compact, high output, expandable design. One significant challenge to such a compact burner box is providing airflow to the burners such that a heating fuel burns completely, thus extracting a high percentage of the energy provided by the fuel, while producing little or no carbon monoxide (CO). Various embodiments address such challenges in part by providing innovative components and innovative configurations of components to direct airflow in a manner that achieves favorable performance in a compact design.

Figure 1:
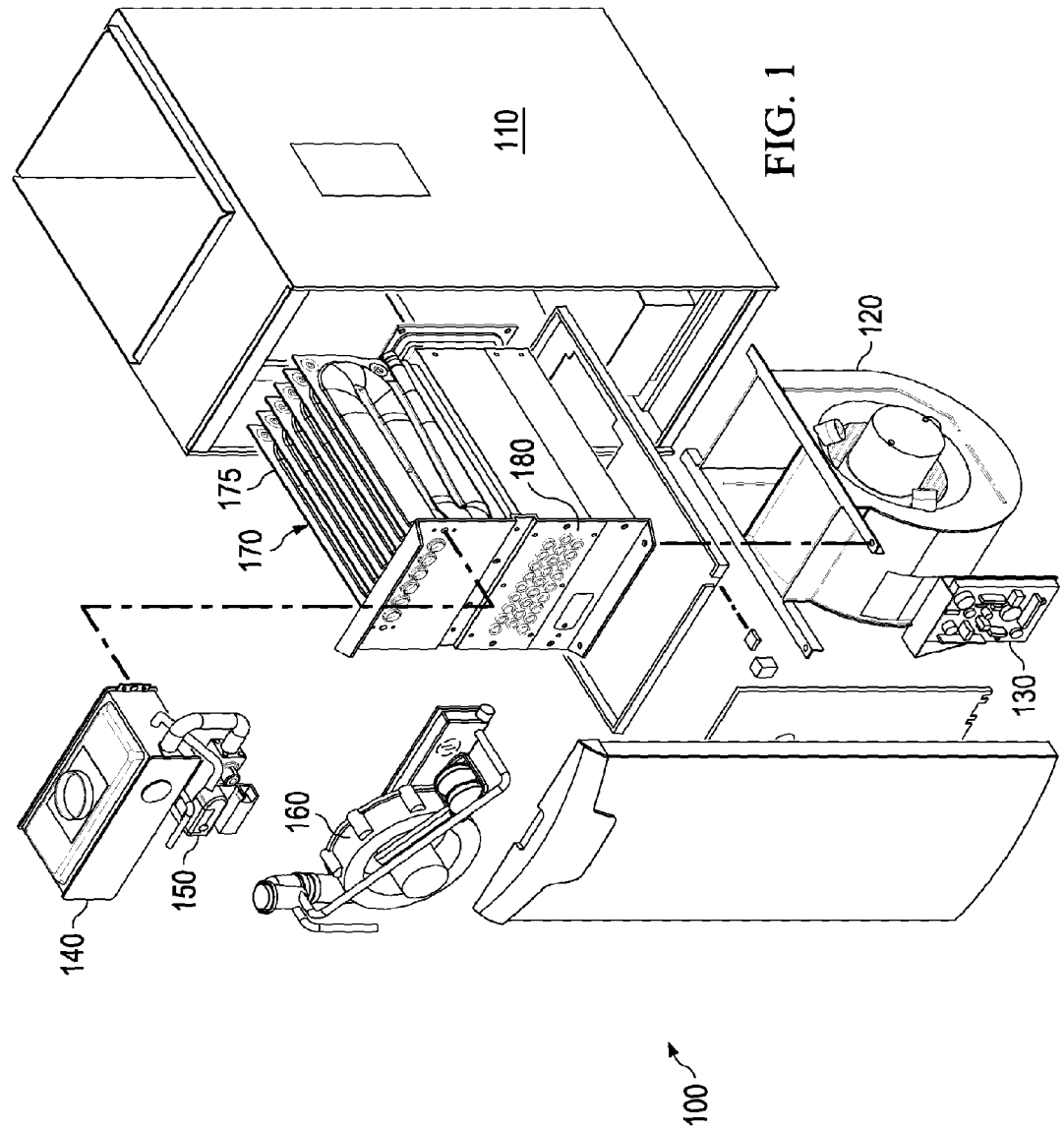
FIG. 1 illustrates a furnace of the disclosure.

Referring initially to FIG. 1, illustrated is a furnace 100 of the disclosure. The furnace 100 is described without limitation in terms of a gas-fired system. However, the disclosure is not limited to any particular heating fuel. Those skilled in the pertinent art will appreciate that the principles disclosed herein may be extended to furnace systems using other fuels The furnace 100 includes various subsystems that may be conventional. A cabinet 110 encloses a blower 120, a controller 130, a burner box 140, a gas control unit 150, a combustion air inducer 160, and a heat exchanger assembly 170. The heat exchanger assembly 170 includes a plurality of heat exchangers 175 fastened to a vest panel 180. Burners within the burner box 140 inject burning fuel, e.g. natural gas, into corresponding inlets of the heat exchangers 175. The controller 130 controls the gas control unit 150 and the combustion air inducer 160 to provide air and fuel to burners within the burner box 140 and to move exhaust gases through the heat exchanger assembly 170 to exhaust outlets of the heat exchanger 175. The controller 130 may further control the blower 120 to move an airstream over the heat exchanger assembly 170, thereby transferring heat from the exhaust gases to the airstream.

Figure 2:
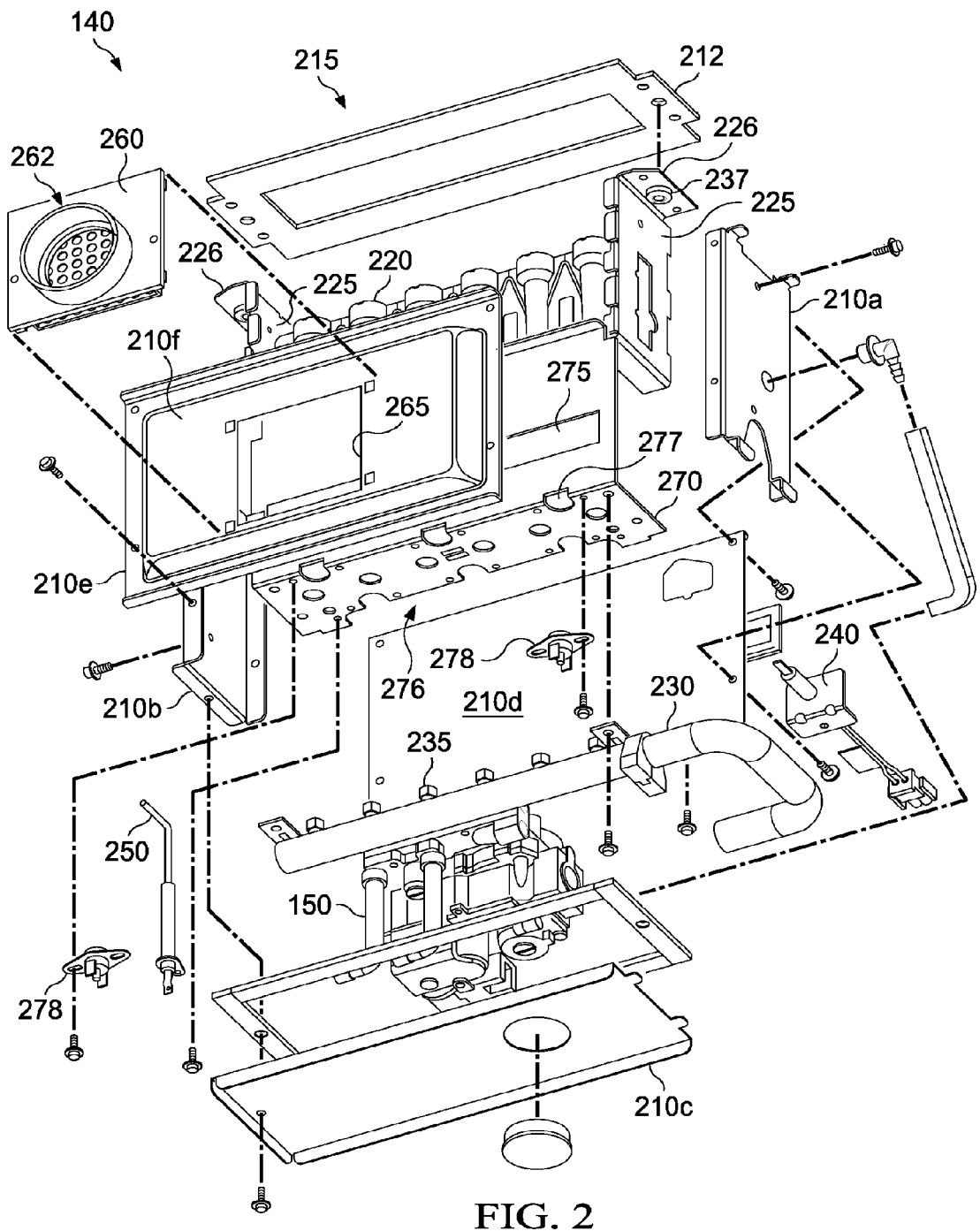
FIG. 2 presents an exploded view of a burner box configured according to various embodiments of the disclosure.

FIG. 2 presents an exploded view of an embodiment of the burner box 140. An enclosure 210 includes side panels 210a, 210b, an access panel 210c, a bottom panel 210d and a top panel 210e. In the illustrated embodiment the top panel 210e includes a raised portion 210f. The enclosure 210 may have a front opening 215 at an end opposite from the access panel 210c. In some embodiments the front opening 215 is covered by the vest panel 180. The enclosure 210 may be formed from sheet steel by conventional manufacturing operations. Brackets 225 include flanges 226 configured to fasten to the vest panel 180. A gasket 212 may be placed between the burner box 140 and the vest panel 180. The brackets 225 support a burner bank 220. The side panels 210a, 210b may also be fastened to the brackets 225. A manifold 230 is located at least partially within the enclosure 210 and adjacent the burner bank 220. The manifold 230 includes gas injectors 235. As used herein and in the claims the manifold 230 is located within the enclosure 210 when at least a portion of the manifold 230 is located within the enclosure 210.

The flanges 226 may also include alignment pins 237. The alignment pins 237 may fit into corresponding receiving holes within the vest panel 180. The alignment pins 237 and the receiving holes may cooperate to ensure alignment between the burner bank 220 and the inlets to the heat exchangers 175. Such alignment may significantly simplify assembly and repair of the furnace 100.

An igniter 240 is located to ignite a gas/air mixture from the burner bank 220 under control of the controller 130. Illustratively, the igniter 240 is located at a first end of the burner bank 220. A flame sensor 250 is located to detect the presence of a flame at the output of the burner bank 220 and provides feedback to controller 130. Illustratively, the flame sensor 250 is located at a second end of the burner bank 220, opposite the igniter 240. In some embodiments the flame sensor 250 includes a right angle bend and is configured to be installed from the rear of the burner box 140 after removing the access panel 210c.

An air director 260, described in further detail below, includes an opening 262 through which an airstream may be received. The air director 260 is coupled to the top panel 210e within an opening 265. In various embodiments, the air director 260 is advantageously configured to direct a first portion of the received airstream toward the burner bank 220, and to direct a second portion toward the manifold 230.

Figure 3A:
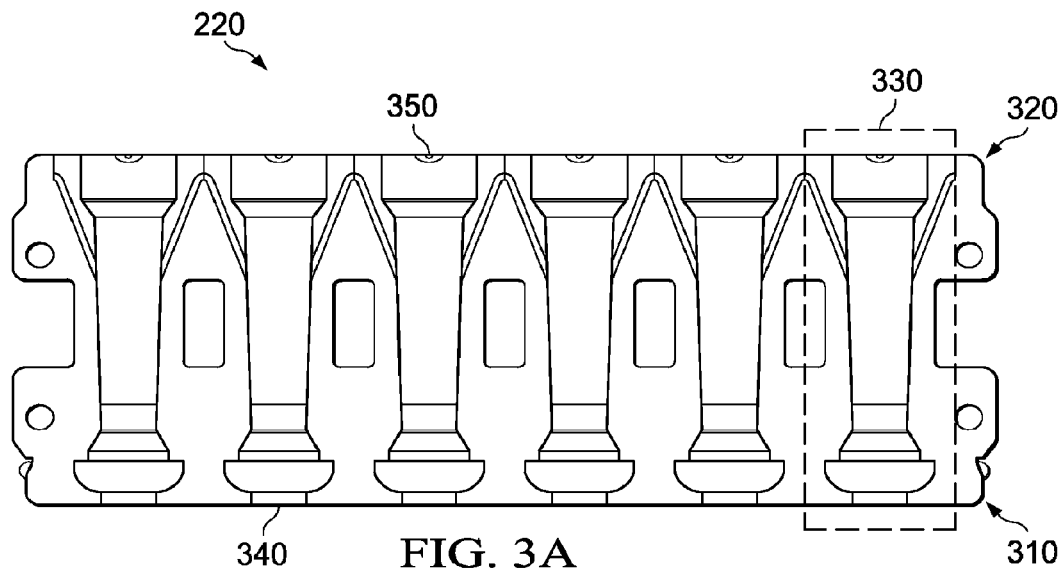
FIGS. 3A and 3B illustrate a top and side view of a burner bank.
Figure 3B:
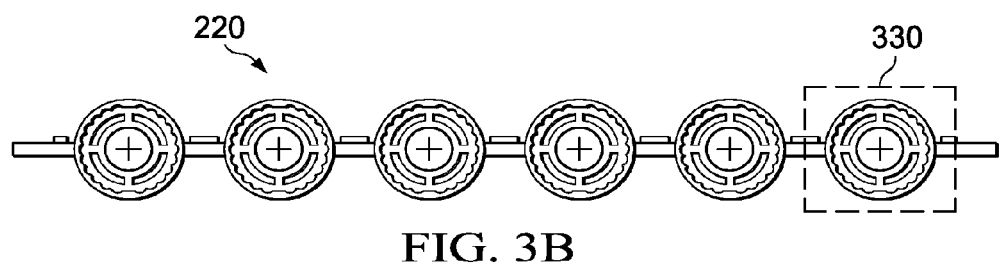

FIGS. 3A and 3B respectively illustrate a top and front view of the burner bank 220. The burner bank 220 has an inlet end 310 and an outlet end 320. In the illustrated embodiment, individual burners 330 are joined into an integrated assembly that may be conventionally mounted within the burner box 140. The burners 330 may be conventional or of novel design. In various embodiments the burners are formed from a conventional steel alloy such as Type 1 or Type 2 aluminized coated steel, or 409 stainless steel. While the illustrated embodiment includes six burners 330, embodiments of the disclosure are not so limited. The heat output of the furnace 100 may be increased or decreased, e.g. by using greater or fewer burners 330, respectively.

Each burner 330 includes a burner inlet 340 and a burner outlet 350. The inlet 340 is configured to receive gas from a corresponding one of the gas injectors 235 on the manifold 230. The gas mixes with air within the burner 330, the mixture supporting a flame suitable for input to the heat exchanger assembly 170. The burning fuel from each burner 330 enters an inlet of a corresponding heat exchanger of the heat exchanger assembly 170, where residual fuel is consumed, and the heat exchanger is heated.

Referring back to FIG. 2, in various embodiments a shroud 270 is located between the air director 260 and the burner bank 220. The shroud 270 includes openings, discussed further below, through which the gas injectors 235 pass. The shroud 270 also illustratively includes a top air inlet 275 and a rear air inlet 276 located to allow air to enter a space enclosed by the shroud 270 that includes the burner bank 220. Optional cutouts 277 provide access for optional sensors 278.

Figure 4A:
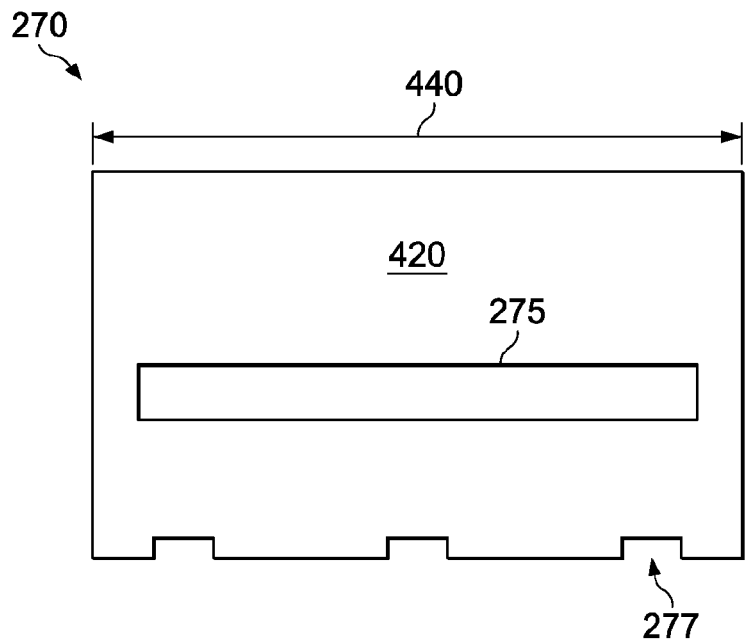
FIGS. 4A-4C respectively present top, side and rear views of a shroud according to various embodiments of the disclosure, suitable for use, e.g. with the burner box of FIG. 2.
Figure 4B:
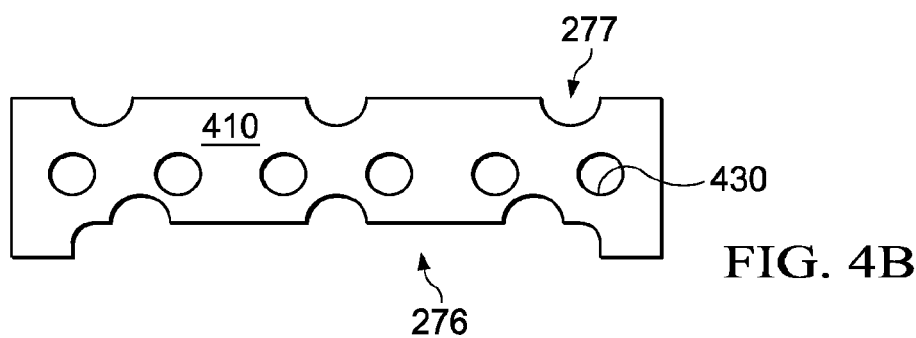
Figure 4C:
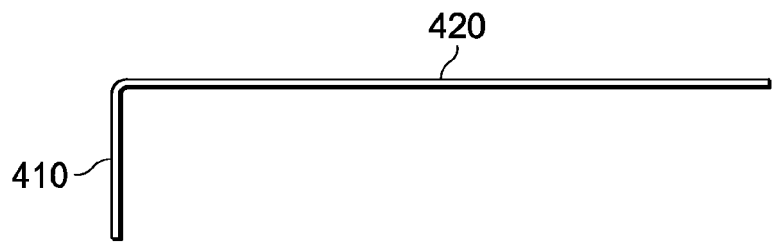

FIGS. 4A, 4B and 4C respectively illustrate a top, side and rear view of the shroud 270. The shroud 270 includes a rear side 410 and a top side 420. Located within the rear side 410 are injector openings 430 adjacent the rear air inlet 276. As described previously, the gas injectors 235 may pass through the injector openings 430 to direct gas to the burners 330. In the illustrated embodiment the only opening in the top side 420 is the top air inlet 275, disregarding small portions of the cutouts 277. The top air inlet 275 in some embodiments spans most, e.g. at least about 60%, of a width 440 of the shroud 270. In some embodiments, it is preferred that the top air inlet 275 spans at least about 70% of the width, with at least about 80% being more preferred. Some embodiments include multiple top air inlets 275. In various embodiments no opening intersects the left or right edges of the shroud 270. Illustratively, the side view of the shroud 270 is unbroken, reflecting such embodiments. In various embodiments all air paths through the rear side 410 have about a same open area as all air paths through the top side 420, so about equal amounts of air flow through the rear side 410 and the top side 420 during operation. However, embodiments of the burner box 140 are not limited to any particular relationship between the airflow through the rear side 410 and the top side 420.

In one embodiment the shroud 270 is slideably coupleable to the brackets 225. In some embodiments such coupling simplifies assembly/disassembly of the burner box 140 from the rear of the unit. In some cases, this ability may significantly simplify servicing the burner box 140, as removal of the burner box 140 from the heat exchanger assembly 170 may be avoided.

Figure 5:
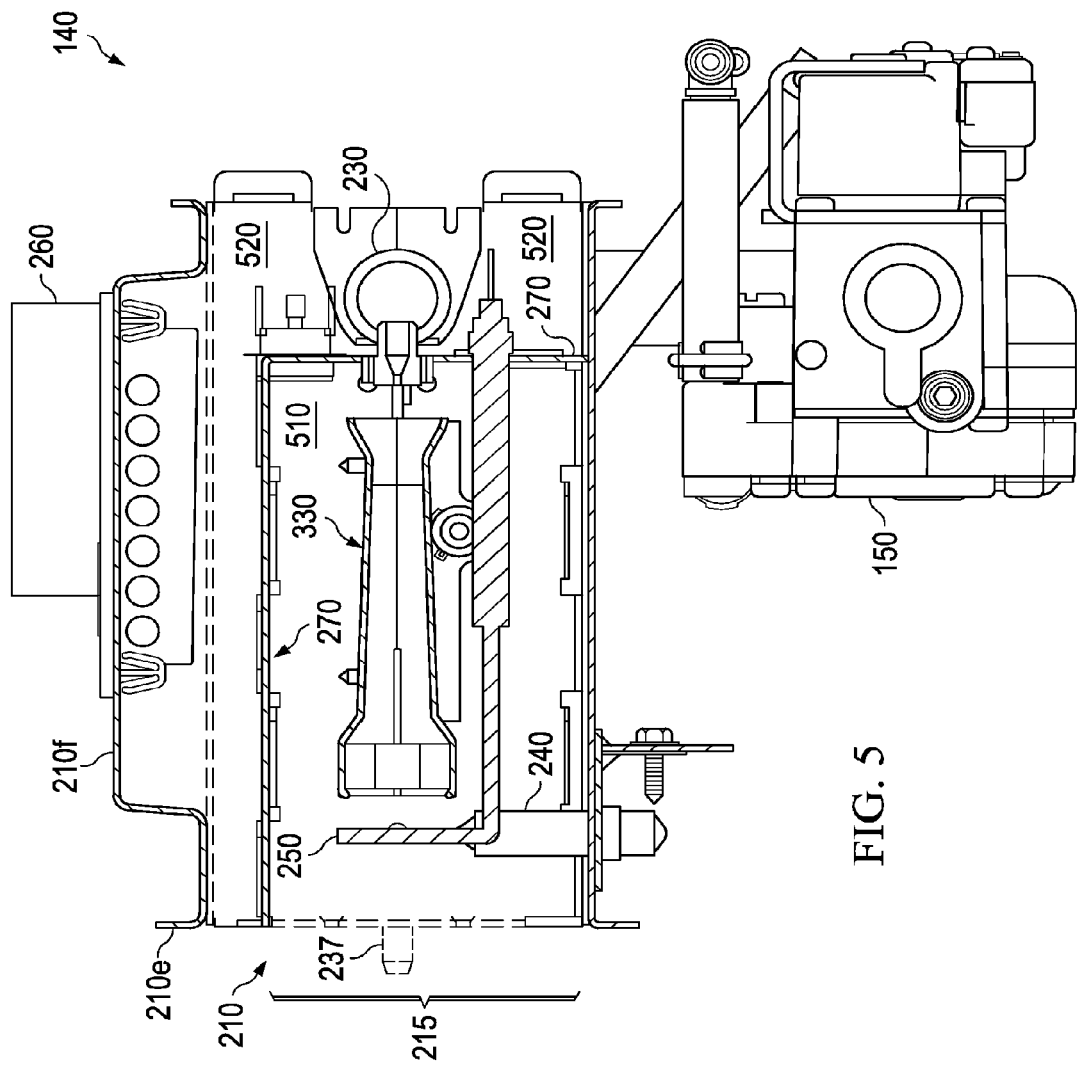
FIG. 5 presents side sectional view of a burner box according to various embodiments of the disclosure, e.g. the burner box of FIG. 2.

FIG. 5 illustrates a side view of the burner box 140 in one embodiment of the disclosure. The shroud 270 divides the volume enclosed by the enclosure 210 into a first subvolume 510 and a second subvolume 520. The first subvolume 510 includes, e.g. the burner bank 220 (of which a single burner 330 is illustrated), the igniter 240 and the flame sensor 250. The second volume 520 includes a portion of the manifold 230, and a portion of the air director 260. The raised portion 210f may provide space for a portion of the air director 260 within the enclosure 210. Unless stated otherwise in the following discussion the first subvolume 510 includes the volume enclosed by the raised portion 210f.

Figure 6:
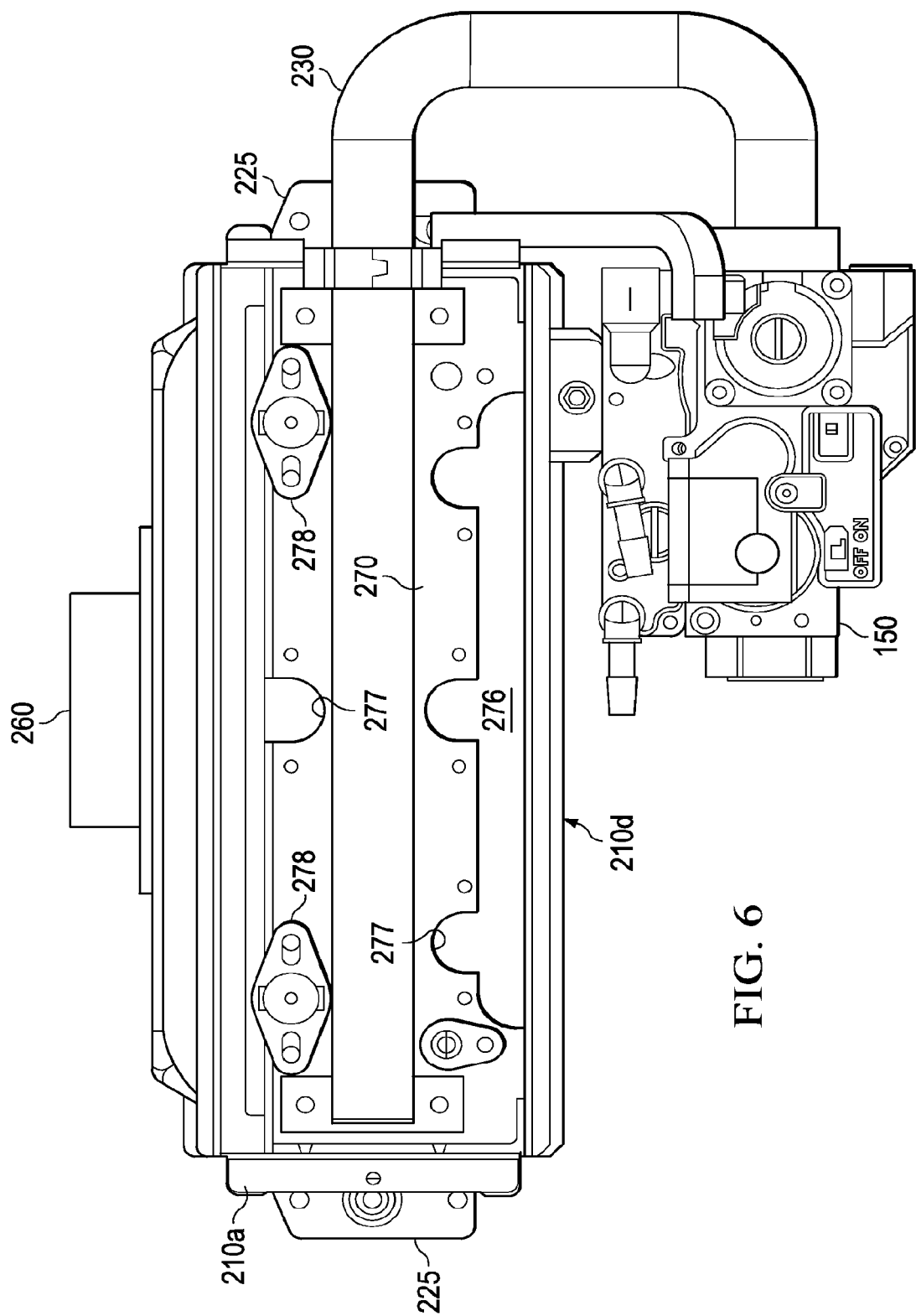
FIG. 6 presents a rear view of a burner box according to various embodiments of the disclosure, e.g. the burner box of FIG. 2.

FIG. 6 presents a rear view of the burner box 140 with the access panel 210c removed, including a portion of the shroud 270. The cutouts 277, when present, may be blocked by one or more of the sensors 278. As described further below, during operation a portion of the air received by the air director 260 flows through the rear air inlet 276. Airflow from the second subvolume 520 through the rear of the shroud 270 to the first subvolume 510 is greater through the rear air inlet 276 than the airflow through other openings such as the cutouts 277, e.g. by at least about 5 times. In one embodiment, as illustrated, the rear air inlet 276 spans at least about one half the width of the burner box 140. In an embodiment the height of the rear air inlet 276 is about ½ the distance from the bottom panel 210d to the manifold 230.

Figure 7:
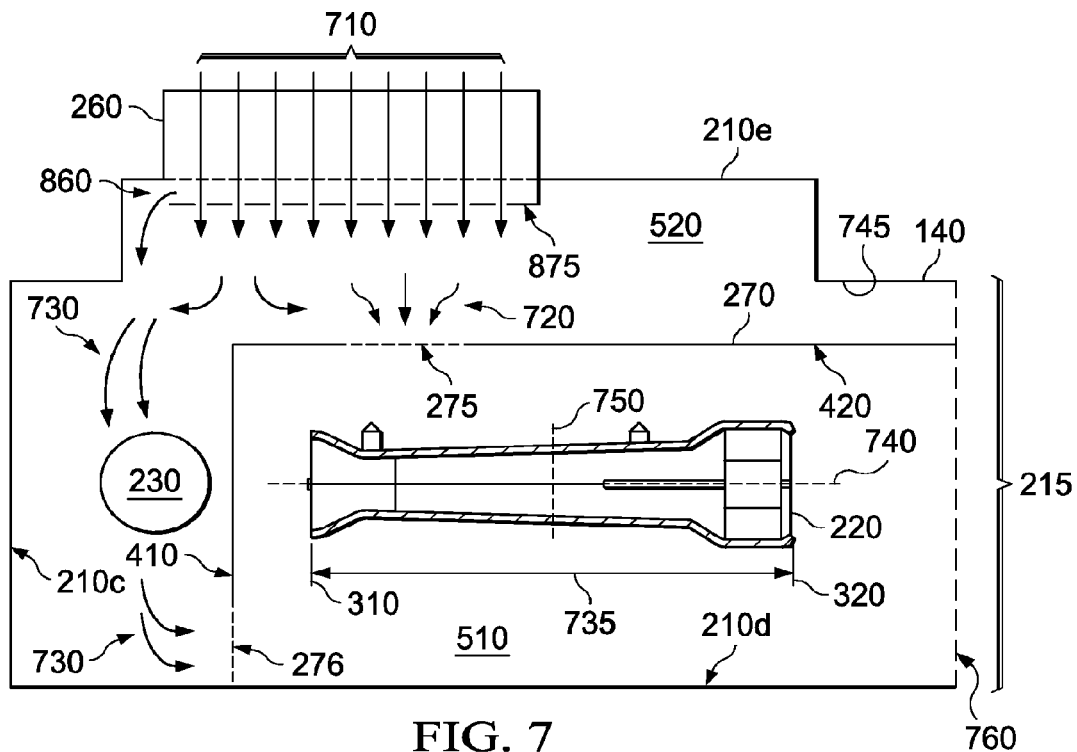
FIG. 7 illustrates a simplified sectional view of a burner box according to various embodiments, e.g. the burner box of FIG. 2, illustrating an example of airflow within the burner box.

FIG. 7 schematically illustrates an airstream 710 received by the burner box 140. The airstream 710 may be received, e.g. from a conduit (not shown) located to provide exterior air to the burner box 140. The air director 260 directs a first air portion 720 toward the top side 420 of the shroud 270. The first air portion 720 may enter the first subvolume 510 via the top air inlet 275. The air director 260 directs a second air portion 730 toward the rear of the enclosure 210, e.g. toward the access panel 210c.

In various embodiments the top air inlet 275 is located between the inlet end 310 and the outlet end 320 of the burner bank 220. In some cases, it is preferred that the top air inlet 275 is located in a range between about 10% and about 40%, more preferably 15% to 35% and most preferably about 20% to 25%, of a distance 735 from the inlet end 310 to the outlet end 320. Regarding the rear air inlet 276, the second air portion 730 may enter the first subvolume 510 therethrough. Thus, the second air portion 730 at least initially flows between the bottom panel 210d and the burner bank 220.

In various embodiments the burner bank 220 is located in a central region of the volume enclosed by the enclosure 210. For example, a horizontal centerline 740 of the burner bank 220 may be located within a range of about 40% to about 60% of a distance between the bottom panel 210d and a top edge 745 of the side panel 210a. A vertical centerline 750 may be located within a range of about 40% to about 60% of a distance between a front edge 760 of the bottom panel 210d and the access panel 210c, more preferably about 40% to about 50%, and most preferably about 44% to about 46%. In another aspect the outlet end 320 of the burner bank 220 may be located in a range between about 20% and about 30% of a distance from the front edge 760 and the rear side 410 of the shroud 270, more preferably between about 22% and about 28%, and most preferably between about 23% and about 25%.

The horizontal centerline 740 may be located between the top side 420 and the rear air inlet 276. The rear air inlet 276 may be located between the horizontal centerline 740 and the bottom panel 210d. Thus, the second air portion 730 may flow between the burner bank 220 and the bottom panel 210d.

It is believed that the described distribution of air within the first subvolume 510 advantageously results in uniform mixing of gas and air within the burners 330, and/or more uniform burning of the gas. For example, gas and air may mix more fully, and/or symmetrically within the burner 330 when the air flows about equally to the top and the bottom of the burner 330. Such uniformity is expected to advantageously maximize the energy extracted from the burning gas, while minimizing undesirable combustion products such as carbon monoxide (CO).

Figure 8A:
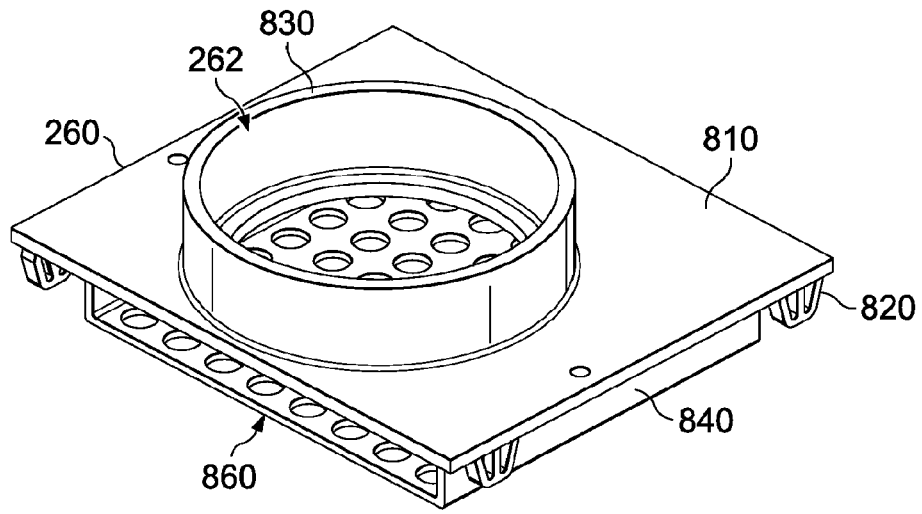
FIGS. 8A-8F illustrate an air director according to various embodiments of the disclosure, suitable for use, e.g. with the burner box of FIG. 2.
Figure 8B:
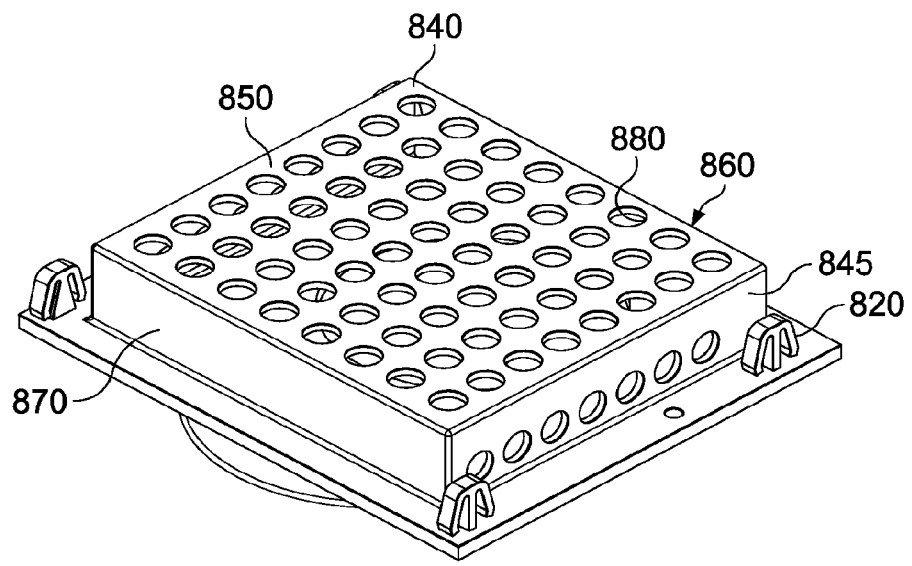
Figure 8C:
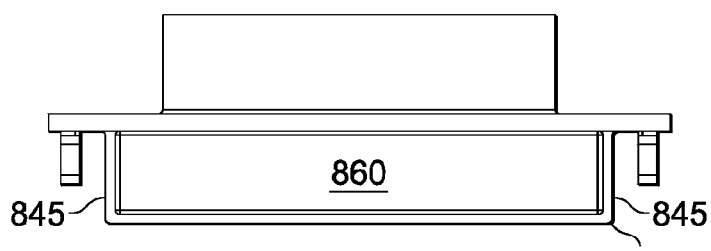
Figure 8D:
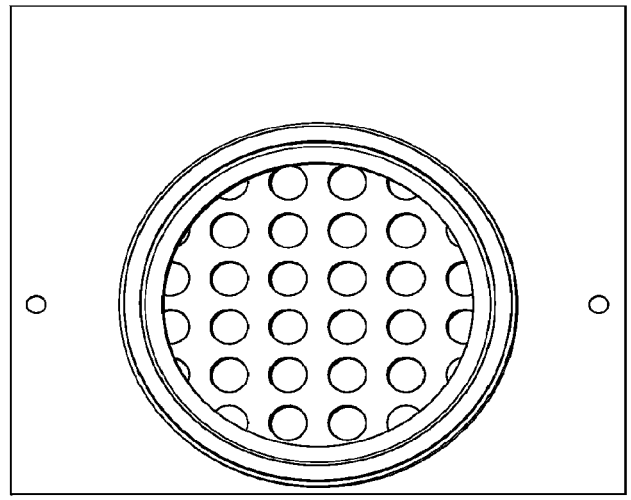
Figure 8E:
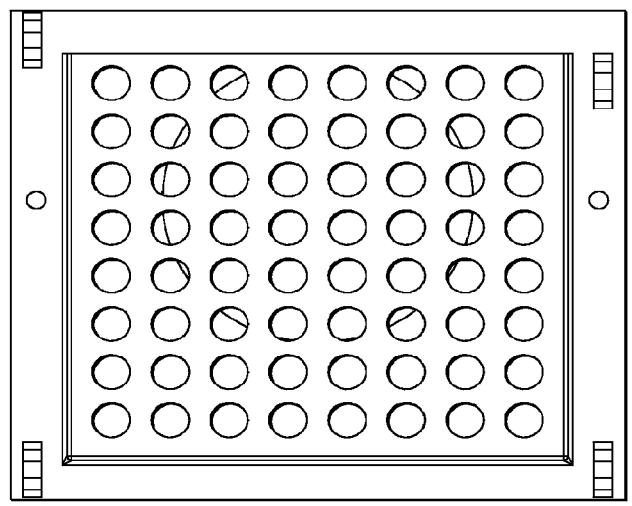
Figure 8F:
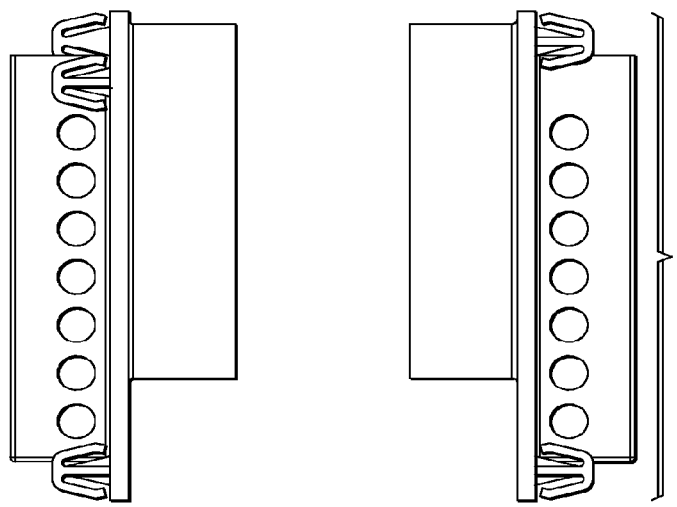

FIGS. 8A-8F illustrate aspects of an embodiment of the air director 260. The illustrated embodiment is expected to provide uniform delivery of air to the burner bank 220, and to decelerate the air as it transitions from the conduit by which it is guided to the air director 260. FIGS. 8A and 8B respectively provide a top and a bottom isometric view of the air director 260, FIGS. 8C, 8D and 8F respectively provide a front, top and bottom view, and FIG. 8F provides left and right side views.

The air director 260 includes a frame 810. The frame 810 provides overall structural support and may have a shape and size appropriate to cover the opening 265 in the top panel 210e. The frame 810 may support mounting clips 820, a receiving ring 830, and an air diffuser 840. In some embodiments fasteners such as screws or rivets replace the mounting clips 820. The mounting clips 820 may be any design that securely engages corresponding mounting holes in the top panel 210e. The receiving ring 830 may provide a mechanical interface to an air conduit (not shown), including providing an adhesive surface. In one embodiment the air conduit is a PVC pipe with a 10.16 cm (4 inch) outside diameter. In one embodiment the components of the air director 260 are formed from a single molded plastic piece. For example, the air director may be conventionally formed from injection molded plastic resin. Plastic materials may include, by way of example, PVC, ABS, polycarbonate, and glass-filled polypropylene.

In the illustrated embodiment, the air diffuser 840 includes a bottom 850, two sides 845 and a back 870. The sides 845 and the bottom 850 are configured to partially obstruct airflow therethrough. For example, in the illustrated embodiment the sides 845 and the bottom 850 include a plurality of diffuser holes 880. In an illustrative embodiment the diffuser holes 880 have a diameter of about 6.5 mm (about 0.255") and are placed on about 9.7 mm (about 0.38") centers. The back 870 may be solid, thereby completely obstructing airflow in that direction. An open side 860 provides an unobstructed path from the opening 262 to the second subvolume 520 (FIG. 5).

In an embodiment the air director 260 is mounted to the burner box 140 with the back 870 oriented toward the front opening 215 and the open side 860 oriented toward the access panel 210c. As air is drawn into the burner box 140 by the combustion air inducer 160, the airstream 710 encounters the air diffuser 840. The airstream 710 is subject to a path resistance determined in part by the number and size of openings in each direction. A portion of the airstream 710 flows through the diffuser holes 880 of the sides 845, another portion flows through the diffuser holes 880 of the bottom 850, and another portion flows through the open side 860. The sides 845 and/or the bottom 850 partially obstruct the flow of air therethrough. By partially obstructs, it is meant that the sides 845 and/or the bottom 850 include structural barriers to airflow, while allowing some air to pass therethrough. Thus the sides 845 and/or the bottom 850 increase resistance to the flow of air in the directions of the sides 845 and/or the bottom 850.

The airflow in each direction in part determines the distribution of airflow within the burner box 140. Thus, airflow from the open side 860 initially flows primarily in the direction of the manifold 230. Airflow from the sides 845 initially flows primarily in the direction of the side panels 210a, 210b. And airflow from the bottom 850 initially flows primarily in the direction of the burner bank 220.

The air inlets in the shroud 270 determine in part the volume rate of air that enters the first subvolume 510 from the direction of the top side 420 and the rear side 410 of the shroud 270. Thus, the air diffuser 840 and the shroud 270 cooperate to distribute the air received by the air director 260 within the burner box 140 in a manner that results in efficient and complete combustion of the burning gas. Of course, those skilled in the pertinent art will appreciate that the illustrated configurations of the air director 260 and the shroud 270 are illustrative, and that optimization may be desirable for a specific design of the burner box 140. For example, the number and diameter of the diffuser holes 880 and the openings in the shroud 270 may be different for a burner box having a different number of burners 330, or having burners 330 configured to have a different heat output.

Figure 9:
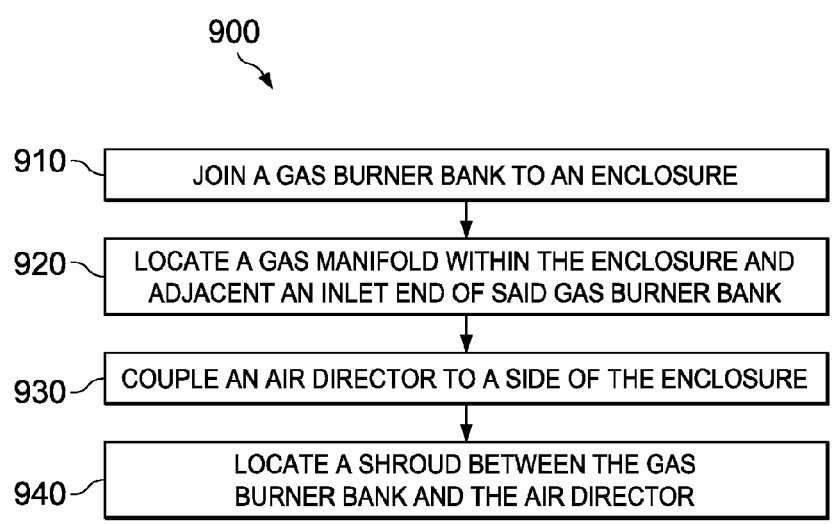
FIG. 9 illustrates a method of manufacturing an HVAC burner box, e.g. the burner box of FIG. 2.

Turning now to FIG. 9, illustrated is an embodiment of a method 900 of the disclosure for manufacturing an HVAC burner box. The method 900 is described without limitation referring to the various components of the burner box 140 described herein. Those skilled in the pertinent art will appreciate that various modifications may be made to the method 900 to accommodate specific design aspects of the burner box 140 without departing from the scope of the method 900. For example, the steps of the method 900 may be performed in an order different than the illustrated order.

The method 900 begins with a step 910 in which the burner bank 220 is joined to the enclosure 210. The joining may include the use of any number of conventional support components and fasteners. The burner bank 220 may be located within the enclosure 210 in a central region of the space enclosed thereby. The burner bank 220 is oriented such that the outlet end 320 thereof faces a front side of the enclosure 210, e.g. the front opening 215, and the inlet end 310 faces a rear side of the enclosure 210, e.g. the access panel 210c.

In a step 920 the manifold 230 is located within the enclosure 210 adjacent the inlet end 310 of the burner bank 220. Each of the gas injectors 235 may be positioned to provide a flow of gas to a respective burner 330 of the burner bank 220.

In a step 930, the air director 260 is coupled to a side of the enclosure, such as the top panel 210e. The air director 260 has an air diffuser, such as the air diffuser 840, with a plurality of openings located therethrough. The air diffuser 840 is configured to direct a received airstream through the openings such that a first air portion of the airstream is directed toward the burner bank 220, and a second air portion is directed toward the manifold 230.

In an optional step 940, the shroud 270 is located between the air director 260 and the burner bank 220. The shroud 270 includes the top air inlet 275 located to allow air from the air director 260 to enter a space enclosed by the shroud 270, e.g. the first subvolume 510. Optionally, the shroud 270 includes the rear air inlet 276 adjacent the injector openings 430.

Optionally, the air diffuser 840 is configured to partially obstruct airflow toward the burner bank 220. Optionally, the air diffuser 840 completely obstructs airflow toward the front opening 215 of the enclosure 210. Optionally the shroud 270 is slideably coupleable to the brackets 225 attached to the burner bank 220. Optionally, a flame sensor, e.g. the flame sensor 250, having a right angle bend is located to detect the presence of a flame at the outlet end 320 of the burner bank 220. Optionally, the flame sensor 250 is configured to be installed from the rear of the enclosure 210.

Although the present invention has been described in detail, those skilled in the art should understand that they can make various changes, substitutions and alterations herein without departing from the spirit and scope of the invention in its broadest form.

What is claimed is:

1. A method of manufacturing an HVAC burner box, comprising:
    joining a burner bank to an enclosure of the burner box such that an outlet end of said burner bank is directed toward a first end front edge of said enclosure;
    locating a manifold within said burner box, that is directly adjacent to a rear air inlet of a shroud, where said rear air inlet is located within a rear side of said shroud; and
    coupling an air director to a side of said enclosure, said air director having a diffuser, said diffuser having a plurality of openings located therethrough, said diffuser being configured to direct a received airstream through said openings such that a first portion of said airflow is directed toward said burner bank and a second portion is directed toward said manifold.

2. The method as recited in claim 1, further comprising locating a shroud between said air director and said burner bank, said shroud including air inlets located to allow air from said air director to enter a space enclosed by said shroud.

3. The method as recited in claim 1, wherein said diffuser is configured to partially obstruct airflow toward said burner bank.

4. A method of manufacturing an HVAC burner box, comprising:
    joining a burner bank to an enclosure such that an outlet end of said burner bank is directed toward a first end of said enclosure;
    locating a manifold within said enclosure and adjacent an inlet end of said burner bank;
    coupling an air director to a side of said enclosure, said air director having a diffuser, said diffuser having a plurality of openings located therethrough, said diffuser being configured to direct a received airstream through said openings such that a first portion of said airflow is directed toward said burner bank and a second portion is directed toward said manifold; and
    wherein said air inlets include a rear air inlet located between a bottom panel of said enclosure and a horizontal centerline of said burner bank.

* * * * *